(12) United States Patent
Ahmed

(10) Patent No.: US 12,095,363 B2
(45) Date of Patent: Sep. 17, 2024

(54) CONTROL ARRANGEMENT

(71) Applicant: Pulsiv Limited, Cambridge (GB)

(72) Inventor: Mohammed Ahmed, Cambridge (GB)

(73) Assignee: PULSIV LIMITED, Cambridge (GB)

( * ) Notice: Subject to any disclaimer, the term of this patent is extended or adjusted under 35 U.S.C. 154(b) by 218 days.

(21) Appl. No.: 17/775,921

(22) PCT Filed: Nov. 10, 2020

(86) PCT No.: PCT/EP2020/081675
§ 371 (c)(1),
(2) Date: May 11, 2022

(87) PCT Pub. No.: WO2021/094332
PCT Pub. Date: May 20, 2021

(65) Prior Publication Data
US 2022/0385180 A1 Dec. 1, 2022

(30) Foreign Application Priority Data
Nov. 12, 2019 (GB) .................................... 1916455

(51) Int. Cl.
*H02M 3/07* (2006.01)
*H02M 3/158* (2006.01)
*H02M 1/00* (2006.01)

(52) U.S. Cl.
CPC ............ *H02M 3/07* (2013.01); *H02M 3/158* (2013.01); *H02M 1/007* (2021.05)

(58) Field of Classification Search
CPC ........ H02M 3/07; H02M 3/071; H02M 3/072; H02M 3/073; H02M 3/075; H02M 3/076;
(Continued)

(56) References Cited

U.S. PATENT DOCUMENTS

2009/0079385 A1 * 3/2009 Xiao ....................... H02M 3/07
320/102
2009/0278520 A1 * 11/2009 Perreault ................. H02M 3/07
323/282

(Continued)

OTHER PUBLICATIONS

Jaber Fallah Ardashir; Mehran Sabahi; Seyed Hossein Hosseini; Frede Blaabjerg; Ebrahim Babaei; Gevork B. Gharehpetian; "A Single-Phase Transformerless Inverter With Charge Pump Circuit Concept for Grid-Tied PV Applications"; 2016; IEEE; Industrial Electronics vol. 64 Issue Jul. 7, 2017; pp. 5403-5415 (Year: 2016).*

(Continued)

*Primary Examiner* — Thienvu V Tran
*Assistant Examiner* — Shahzeb K Ahmad
(74) *Attorney, Agent, or Firm* — Andrus Intellectual Property Law, LLP

(57) ABSTRACT

A control arrangement that includes an inductor of small inductance and having an input side and an output side, the input side being connected to an input line connected, in use, to an output from a power supply, and the output side being connected to an output line connected, in use, to a load. A switched capacitor arrangement is located at the input side of the inductor, the switched capacitor arrangement being arranged such that an average voltage on the input line is maintained above a predetermined level during use of the control arrangement.

13 Claims, 1 Drawing Sheet

(58) Field of Classification Search
CPC ...... H02M 3/156; H02M 3/158; H02M 1/007; H02M 1/0095
See application file for complete search history.

(56) References Cited

U.S. PATENT DOCUMENTS

2016/0352219 A1* 12/2016 Amgad Abdulslam ............... H02M 1/08
2018/0367033 A1* 12/2018 Kotikalapoodi ........ H02M 1/14

OTHER PUBLICATIONS

Qingquan Tang; Bo Li; Dariusz Czarkowski; Adrian Ioinovici; "Switched-capacitor based step-up converter for alternative energy applications"; Jul. 4, 2011; IEEE; 2011 IEEE International Symposium of Circuits and Systems (ISCAS); pp. 1355-1358 (Year: 2011).*

Search Report for related GB Application No. 2017738.2 dated Apr. 28, 2021.

International Search Report and Written Opinion for International Application No. PCT/EP2020/081675 mailed Feb. 5, 2021.

Qingquan, Tang et al.: Switched-capacitor based step-up converter for alternative energy applications. Circuits and Systems, 2011 IEEE International Symposium On. May 15, 2011, pp. 1355-1358.

Cheng, KW et al.: Design and Analysis of Switched-Capacitor-Based Step-Up Resonant Converters. IEEE Transactions on Circuits and Systems Part I: Regular Papers, IEEE Service Center, New York, NY, US. vol. 52, No. 5, May 1, 2005, pp. 943-948.

Wuhua, Li et al.: Review of Nonisolated High-Step-Up DC/DC Converters in Photovoltaic Grid-Connected Applications. IEEE Transactions on Industrial Electronics, IEEE Service Center, Piscataway, NJ, US. vol. 58, No. 4, Apr. 1, 2011, pp. 1239-1250.

Mondzik, A. et al.: High efficiency switched capacitor voltage doubler with planar core-based resonant choke. 2016 10th International Conference on Compatibility, Power Electronics and Power Engineering (CPE-Powereng), IEEE, Jun. 29, 2016, pp. 402-409.

Alassi, Abdulrahman et al.: High-gain DC-DC converters for high-power PV applications: Performance assessment. 2018 IEEE12th International Conference on Compatibility, (CPE-Powereng 2018), IEEE, Apr. 10, 2018, pp. 1-6.

* cited by examiner

CONTROL ARRANGEMENT

CROSS-REFERENCE TO RELATED APPLICATIONS

This application is the U.S. national stage application of International Application PCT/EP2020/081675, filed Nov. 10, 2020, which international application was published on May 20, 2021, as International Publication WO 2021/094332 A1 in the English language. The International Application claims priority of Great Britain Patent Application 1916455.7, filed Nov. 12, 2019.

BACKGROUND

This invention relates to a control arrangement, and in particular to a control arrangement suitable for use in the extraction of electrical energy from a power source to assist in increasing the level of available extracted electrical energy. The invention is particularly suitable for use in conjunction with a photovoltaic panel or the like, but it will be appreciated that the invention is not restricted in this regard and may be used with certain other forms of electrical power source.

There is an increasing reliance upon photovoltaic panels in the generation of electrical power, and there is a desire to increase the efficiency of schemes including such power sources or supplies, for example to allow an increase in the level of useful energy that can be extracted therefrom or to enable continued use thereof under, for example, relatively low light conditions when, in the absence of schemes to increase the output of such sources, alternative electrical power sources may need to be relied upon.

SUMMARY

It is an object of the invention to provide a control arrangement whereby the level of electrical energy that can be extracted from such a power source or supply, for example in the form of a photovoltaic panel, can be increased.

According to a first aspect of the invention there is provided a control arrangement comprising an inductor of small inductance and having an input side and an output side, the input side being connected to an input line connected, in use, to an output from a power supply, and the output side being connected to an output line connected, in use, to a load, and a switched capacitor arrangement located to the input side of the inductor, the switched capacitor arrangement being arranged such that an average voltage on the input line is maintained above a predetermined level during use of the control arrangement.

It has been found that by maintaining the average voltage across a power source in the form of a photovoltaic panel above a predetermined level, the power output thereof can be increased.

By maintaining the average voltage on the input line above a predetermined level, the voltage across the power source can be maintained in such a fashion as to enhance the useful output of the panel.

The switched capacitor arrangement preferably comprises a first capacitor and a second capacitor, a charging switch operable to control whether the first capacitor is connected to the input line, and hence whether charging of the first capacitor is able to take place, a transfer switch controlling a connection between the first and second capacitors, thereby controlling whether discharge of the first capacitor to charge the second capacitor can take place, and a discharge switch controlling whether the second capacitor is connected to the input line, and hence controlling whether discharge from the second capacitor to the input line is permitted. A fourth switch is preferably provided in the input line, controlling connection of the inductance to the power supply, in use.

In use, when the charging and discharge switches are both open, and the transfer and fourth switches are both closed, the second capacitor is charged from the first capacitor, and the power supply is connected to the load via the inductance. Subsequent switching of all of the switches disconnects the inductor from the power supply and isolates the second capacitor from the first capacitor. During this phase of operation, as the charging switch is closed the output from the power supply is used to charge the first capacitor, the residual charge on the first capacitor together with that on the capacitor associated with the power supply ensuring that the average voltage across the power supply is maintain at or above the predetermined level. As the discharge switch is closed, discharge of the second capacitor through the inductor results in energy being stored within the inductor. By repeatedly switching the switches between these positions, it will be appreciated that the average voltage across the power supply can be maintained at or above a required predetermined level to enhance the output thereof. Accordingly, the level of electrical energy that can be extracted from the power supply is enhanced.

The first capacitor is preferably of larger capacitance than the second capacitor. By way of example, it may be 2-4 times the capacitance of the second capacitor, and is preferably around 3 times the capacitance of the second capacitor.

The inductor which is of small inductance is preferably of smaller inductance than the minimum inductance typically used in a high frequency electrical conversion circuit operating at a given high frequency. By way of example, it is preferably of inductance less than 30 μH, and may be in the region of 15-25 μH.

The switching frequency at which the operating cycle described hereinbefore is undertaken is preferably in the region of 15-25 kHz.

The transfer switch may form part of a boost circuit interposed between the first and second capacitors. By way of example, the boost circuit may comprise an inductor, preferably of small inductance, and the transfer switch connected in series between the first and second capacitors, and a switched ground connection connected to a point between the inductor of the boost circuit and the transfer switch. The transfer switch, in this embodiment, conveniently takes the form of a diode. In use, by repeatedly opening and closing the switched ground connection, the boost circuit can serve to boost or raise the voltage on the second capacitor to a level higher than that on the first capacitor, and higher than that attained in the arrangement of FIG. 1, with the result that an increased current through the inductance can be attained. In this arrangement, the switching frequency of the switched ground connection will typically be higher, preferably significantly higher than (for example 1.5 or more times) the switching frequency of the other switches.

The invention further relates to a control method for use in controlling a control arrangement of the type described hereinbefore, the method comprising the steps of controlling the switched capacitor arrangement such that in a first operating mode a first capacitor thereof is charged from the power supply and a second capacitor thereof discharges through the inductor, and in a second operating mode thereof, the first capacitor discharges into the second capacitor, the control arrangement being repeatedly switched between the first operating mode and the second operating mode.

BRIEF DESCRIPTION OF THE DRAWINGS

The invention will further be described, by way of example, with reference to the accompanying drawings, in which.

DETAILED DESCRIPTION OF THE DRAWINGS

Figure 1:
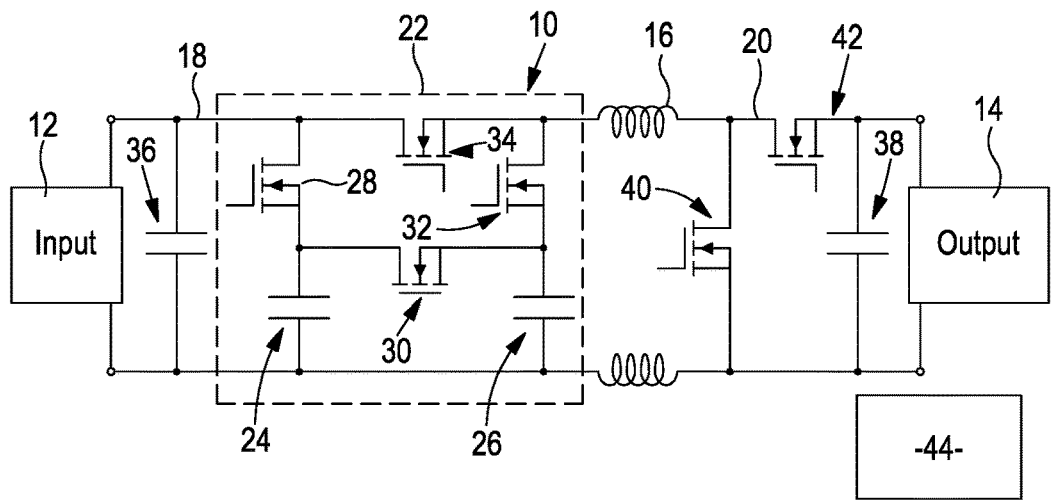
FIG. 1 is a circuit diagram illustrating a control arrangement in accordance with an embodiment of the invention.

Referring firstly to FIG. 1, a control arrangement 10 is shown for use in controlling the extraction of electrical energy from a power source 12, in this case in the form of a photovoltaic panel, for use by a load 14. Whilst the description herein relates to the extraction of electrical energy from a photovoltaic panel, it will be appreciated that the invention is not restricted in this regard and may be used in conjunction with certain other forms of power source 12.

By way of background, it has been found that the level of electrical energy that can be extracted from a photovoltaic panel can be increased where the size of the inversion layer within the panel is increased, as this enhances the quantum efficiency of the panel. Increasing the size of the inversion layer can be achieved by impressing a voltage or potential difference upon the panel that is greater than the average potential difference that is applied to the panel if it is operated using a conventional maximum power point tracking methodology. The control arrangement 10 is thus operable to apply, at all times during the operation thereof, an increased voltage or potential difference to the power source 12, having an average level greater than or equal to a predetermined level. By way of example, depending upon the specifications of the panel, it may be arranged to maintain an average applied voltage across the panel of at least 30V.

As shown in FIG. 1, the control arrangement 10 comprises an inductor 16 of small inductance having an input side connected to an input line 18 and an output side connected to an output line 20. The input line 18 is connected to an output of the power source 12, and the output line 20 is connected to the load 14.

A switched capacitor arrangement 22 is connected to the input line 18 between the power source 12 and the inductor 16. The switched capacitor arrangement 22 comprises a first capacitor 24 and a second capacitor 26. The first capacitor 24 is connected, via a charging switch 28, to the input line 18, and via a transfer switch 30 to the second capacitor 26. The second capacitor 26 is connected via a discharge switch 32 to the input line 18. As illustrated, a fourth switch 34 is located in the input line 18 at a point intermediate the points at which the charging switch 28 and discharge switch 32 are connected thereto.

The control arrangement 10 further comprises input and output capacitors 36, 38, and first and second boost switches 40, 42.

A control unit 44 is provided and is operable to control the operation of the switches 28, 30, 32, 34, 40, 42. The manner in which the switches are controlled is that the switches are broken down into a first group made up of the charging switch 28, discharge switch 32 and first boost switch 40, and a second group made up of the transfer switch 30, the fourth switch 34 and the second boost switch 42. The control unit 44 is arranged to control the switches such that in a first operating mode the first group of switches are in an on position and the second group of switches are in an off position, and in a second operating mode the second group of switches are in an on position and the first group of switches are in an off position. The control unit 44 cycles the switches repeatedly between the first and second modes, switching between these operating modes at a high frequency, for example in the region of 15-25 kHz.

When in the first mode, the inductor 16 is disconnected from the power supply 12, and the output from the power supply 12 is used to charge the first capacitor 24. Discharge of the second capacitor 26 through the inductor 16 and the first boost switch results in the storage of energy within the inductor 16. The charge of the first capacitor 24 and the input capacitor 36 maintains the voltage or potential difference across the power supply 12 at or above the predetermined level to enhance the operation thereof as described hereinbefore.

Upon subsequently switching to the second mode of operation, the closing of the fourth switch 34 and second boost switch 42 connects the power supply 12 to the output 14 via the inductor 16. The inductor 16 causes a reverse current transferring charge from the output capacitor 38 to the input capacitor 36 sufficient to maintain the required voltage or potential difference across the power supply 12 to enhance the operation thereof. Meanwhile, the opening of the transfer switch 30 results in partial discharge of the first capacitor 24 and charging of the second capacitor 26, ready for returning to the first mode. By repeatedly switching between these operating modes, it will be appreciated that electrical energy can be extracted from the power supply 12 whilst a sufficiently high average voltage or potential difference is maintained across the power supply 12 to enhance the efficiency thereof and thereby allow additional electrical energy to be available for extraction.

Figure 2:
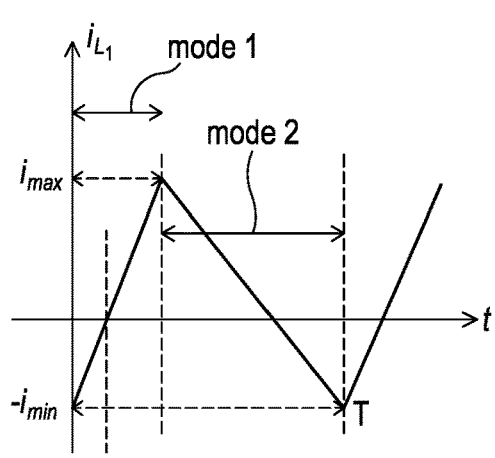
FIGS. 2 and 3 are graphs illustrating the inductor current and voltage on the second capacitor.
Figure 3:
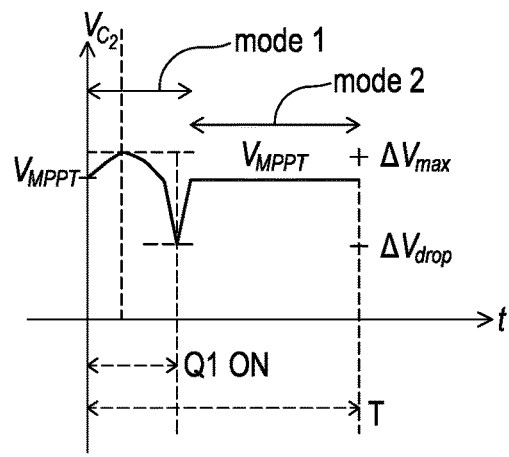

FIGS. 2 and 3 illustrate the inductor current and the charge on the second capacitor during these operating modes showing that by repeatedly switching between these operating modes, electrical energy can be extracted from the power supply whilst maintaining a sufficient voltage or potential difference across the power supply 12 to maintain operation thereof at an enhanced level.

The second capacitor 26 should be of a size sufficient to ensure that, once discharge thereof to charge the inductor 16 has taken place, sufficient charge remains on the second capacitor 26 that a negative voltage across the device is avoided. In order to ensure that charging of the second capacitor 26 can occur quickly and efficiently, and that the second capacitor 26 is charged to an appropriate level, the first capacitor 24 should be larger than the second capacitor, for example 2-4 times the capacitance of the second capacitor 26, and preferably about 3 times the capacitance of the second capacitor 26. Similarly, the output capacitor should be of larger capacitance than the input capacitor. Conveniently, in order to minimise the number of component sizes present in the circuit, the input and output capacitors may be of the same sizes as the charging and discharge capacitors. By way of example, in one arrangement, the inductor 16 may be of inductance in the region of 21 µH, the second capacitor 26 may be of capacitance in the region of 10 µF and the first capacitor 24 may be of capacitance 29 µF. In an alternative arrangement, the inductance may be 16 μH and the capacitances may be 8 μF and 23 μF respectively. Clearly, these are just examples and other component sizes may be used, if desired.

The circuit is preferably operated at a switching speed in the range of 15-25 kHz. By way of example, with the first set of component sizes mentioned above it may be operated at a switching frequency of 17 kHz, and with the second set of component sizes it may be operated at a switching frequency of 22 kHz. It has been found that, in this manner, an average voltage or potential difference of at least 30V can be maintained across the power supply.

As mentioned hereinbefore, by maintaining the voltage or potential difference across the power supply 12 at or above a predetermined level, it has been found that energy extraction therefrom can be enhanced by, for example, around 5% on average. Accordingly, the use of the invention represents a significant enhancement when compared to conventional control arrangements.

Figure 4:
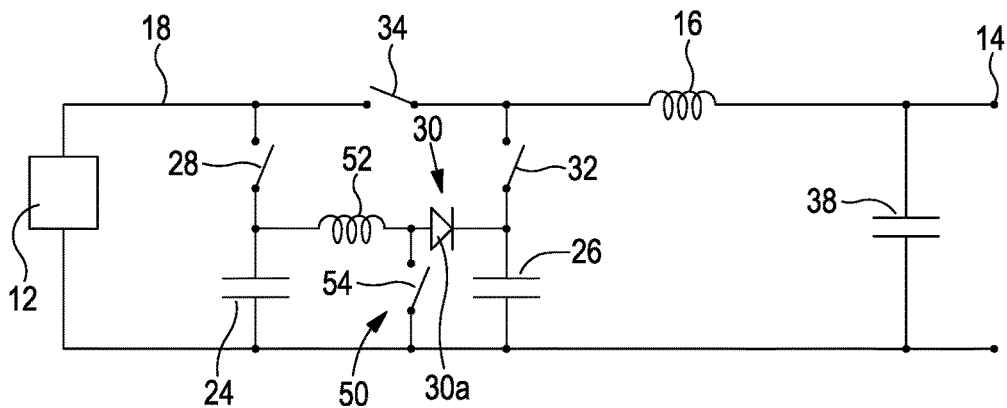
FIG. 4 is a view similar to FIG. 1 illustrating a modification to the control arrangement.

FIG. 4 illustrates a modification to the arrangement of FIGS. 1 to 3 in which the transfer switch 30 forms part of a boost circuit 50 interposed between the first and second capacitors 24, 26 so that, when the second capacitor 26 is being charged from the first capacitor 24, the boost circuit 50 can serve to boost the voltage on the second capacitor 26 to a higher level than would otherwise be attained. The boost circuit 50 comprises an inductor 52 connected in series with the transfer switch 30 (which in this embodiment conveniently takes the form of a diode 30a) between the first and second capacitors 24, 26, and a switched ground connection 54 connected to a point between the inductor 52 of the boost circuit 50 and the transfer switch 30.

In use, by repeatedly opening and closing the switched ground connection 54 when charging of the second capacitor 26 from the first capacitor 24 is taking place, it will be appreciated that the boost circuit 50 operates to raise the voltage on the second capacitor 26 to a level exceeding that on the first capacitor 24. As a consequence, upon discharge of the second capacitor 26, the current supplied to the inductance 16 can be increased, and so the circuit output may be increased.

The switching frequency of the switched ground connection 54 is preferably greater than that of the other switches, conveniently significantly greater. By way of example, it may be 1.5 times or more the switching frequency of the other switches.

If desired, by appropriate monitoring of the voltage on the second capacitor 26, the boost function may be switched off (by keeping the switched ground connection open) if the voltage on the second capacitor 26 exceeds a predetermined level.

Whilst specific embodiments of the invention are described herein, it will be appreciated that these represent just example embodiments and that a number of modifications or alterations may be made thereto without departing from the scope of the invention which is defined by the appended claims.

The invention claimed is:

1. A control arrangement comprising:
an inductor of small inductance and having an input side and an output side, the input side being connected to an input line connected, in use, to an output from a power supply, and the output side being connected to an output line connected, in use, to a load, and a switched capacitor arrangement located to the input side of the inductor,
the switched capacitor arrangement being arranged such that an average voltage on the input line is maintained above a predetermined level during use of the control arrangement,
wherein the switched capacitor arrangement comprises a first capacitor and a second capacitor, a charging switch operable to control whether the first capacitor is connected to the input line, and hence whether charging of the first capacitor is able to take place, a transfer switch controlling a connection between the first and second capacitors, thereby controlling whether discharge of the first capacitor to charge the second capacitor can take place, and a discharge switch controlling whether the second capacitor is connected to the input line, and hence controlling whether discharge from the second capacitor to the input line is permitted, and
wherein the first capacitor is of larger capacitance than the second capacitor.

2. The arrangement according to claim 1, further comprising a fourth switch provided in the input line, controlling connection of the inductor to the power supply, in use.

3. The arrangement according to claim 1, wherein the first capacitor is of 2 to 4 times a capacitance of the second capacitor.

4. The arrangement according to claim 3, wherein the first capacitor is of around 3 times the capacitance of the second capacitor.

5. The arrangement according to claim 1, wherein the inductor is of inductance less than 30 μh.

6. The arrangement according to claim 5, wherein the inductor is of inductance in a region of 15-25 μh.

7. The arrangement according to claim 1, and operating at a switching frequency in a region of 15-25 khz.

8. A control method for use in controlling the control arrangement as claimed in claim 1, the method comprising the steps of controlling the switched capacitor arrangement such that in a first operating mode a first capacitor thereof is charged from the power supply and a second capacitor thereof discharges through the inductor, and in a second operating mode thereof, the first capacitor discharges into the second capacitor, the control arrangement being repeatedly switched between the first operating mode and the second operating mode.

9. A control arrangement comprising:
an inductor of small inductance and having an input side and an output side, the input side being connected to an input line connected, in use, to an output from a power supply, and the output side being connected to an output line connected, in use, to a load, and a switched capacitor arrangement located to the input side of the inductor,
the switched capacitor arrangement being arranged such that an average voltage on the input line is maintained above a predetermined level during use of the control arrangement,
wherein the switched capacitor arrangement comprises a first capacitor and a second capacitor, a charging switch operable to control whether the first capacitor is connected to the input line, and hence whether charging of the first capacitor is able to take place, a transfer switch controlling a connection between the first and second capacitors, thereby controlling whether discharge of the first capacitor to charge the second capacitor can take place, and a discharge switch controlling whether the second capacitor is connected to the input line, and hence controlling whether discharge from the second capacitor to the input line is permitted, and wherein the transfer switch forms part of a boost circuit interposed between the first and second capacitors.

10. The arrangement according to claim 9, wherein the boost circuit comprises a second inductor and the transfer switch connected in series between the first and second capacitors, and a switched ground connection connected to a point between the inductor of the boost circuit and the transfer switch.

11. The arrangement according to claim 10, wherein the second inductor is of small inductance.

12. The arrangement according to claim 10, wherein the transfer switch comprises a diode.

13. The arrangement according to claim 10, wherein the switching frequency of the switched ground connection is higher than the switching frequency of the charging switch, the transfer switch and the discharge switch.

* * * * *